(12) United States Patent
Wen et al.

(10) Patent No.: US 12,730,437 B2
(45) Date of Patent: Sep. 8, 2026

(54) LUBRICATOR CONTROL SYSTEM

(71) Applicant: AKTIEBOLAGET SKF, Gothenburg (SE)

(72) Inventors: Xue Jun Wen, Shanghai (CN); Yilei Ji, Shanghai (CN); Kai Gu, Shanghai (CN); Sheng Tao, Changshu City (CN); Huiqi Yu, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 305 days.

(21) Appl. No.: 18/359,935

(22) Filed: Jul. 27, 2023

(65) Prior Publication Data

US 2024/0053732 A1 Feb. 15, 2024

(30) Foreign Application Priority Data

Aug. 9, 2022 (CN) ......................... 202210949630.8

(51) Int. Cl.
*G05B 19/418* (2006.01)

(52) U.S. Cl.
CPC ..... *G05B 19/4186* (2013.01); *G05B 19/4183* (2013.01); *G05B 19/4184* (2013.01)

(58) Field of Classification Search
CPC ............ G05B 19/4186; G05B 19/4183; G05B 19/4184; G05B 2219/49043;
(Continued)

(56) References Cited

U.S. PATENT DOCUMENTS 5,732,794 A 3/1998 Orlitzky
5,921,350 A 7/1999 Tsai
(Continued)

FOREIGN PATENT DOCUMENTS

CN 202915021 U 5/2013
CN 210069438 U 2/2020
CN 114001267 A 2/2022

OTHER PUBLICATIONS

Office Action from the United States Patent Office mailed Oct. 21, 2025, in related U.S. Appl. No. 18/359,942.
(Continued)

*Primary Examiner* — Kenneth M Lo
*Assistant Examiner* — Mohammed Shafayet
(74) *Attorney, Agent, or Firm* — J-TEK LAW PLLC; Scott T. Wakeman; Mark A. Ussai

(57) ABSTRACT

A lubricator control system includes a lubricator, an Internet-of-things platform, and an application server. The lubricator is configured to communicate with the application server in a long-distance and low-power consumption wireless communication mode, the lubricator is configured to communicate with the Internet-of-things platform via 5G-NB-IoT communication and to send target information to the Internet-of-things platform in the long-distance and low-power consumption wireless communication mode, and the Internet-of-things platform is configured to send the target information to the application server. In addition, the application server is configured to receive the target information and to send corresponding target response information to the Internet-of-things platform, and the Internet-of-things platform is configured to send the target response information to the lubricator via 5G-NB-IoT communication in the long-distance and low-power consumption wireless communication mode.

9 Claims, 3 Drawing Sheets

(58) Field of Classification Search
CPC .... G05B 19/406; Y02D 30/70; H04L 67/125; F16N 29/04; F16N 2230/00; F16N 2270/00; G08B 25/08; G08C 17/02; G16Y 40/30; H04Q 9/00
See application file for complete search history.

(56) References Cited

U.S. PATENT DOCUMENTS 6,123,174 A 9/2000 Elkin et al.
6,216,822 B1 4/2001 May et al.
6,354,816 B1 3/2002 Yang
8,424,722 B2 4/2013 Koch et al.
8,509,935 B2 8/2013 Hoyte et al.
8,893,857 B2 11/2014 Ifield
9,109,748 B2 8/2015 Lakomiak et al.
9,659,414 B2 5/2017 Staley et al.
10,041,844 B1 8/2018 Brady et al.
10,386,015 B2 8/2019 Kuijpers et al.
10,876,685 B2 12/2020 Alexander
11,035,715 B2 6/2021 Polly et al.
11,371,297 B1 * 6/2022 Cree .................... E21B 33/072
12,305,803 B1 * 5/2025 Lin ......................... F16N 29/02
2010/0147627 A1 6/2010 Lakomiak et al.
2018/0186451 A1 7/2018 Erickson et al.
2018/0262574 A1 * 9/2018 Choi .................... F24H 15/104
2019/0182772 A1 * 6/2019 Larmo .............. H04W 52/0229
2020/0355323 A1 * 11/2020 Amar ...................... F16N 11/00
2022/0127982 A1 * 4/2022 O'Callaghan ........... F16N 29/00
2022/0196141 A1 6/2022 Bishop et al.
2024/0053733 A1 2/2024 Wen et al.
2024/0053734 A1 2/2024 Wen et al.

OTHER PUBLICATIONS

Abstract and Drawing of Indian Patent Application No. 2021IN-41036204 A filed Aug. 11, 2021.

Baiji, Youssef, and Prabha Sundaravadivel. "I Lo Leak-detect: An IoT-based LoRAWAN-enabled oil leak detection system for smartcities." 2019 IEEE International Symposium on Smart Electronic Systems (iSES)(Formerly iNiS). IEEE, 2019 (Year: 2019).

Pulsarlube BT, https://pulsarlube.com/blog/blog?tpf=form/blog&form_code=20&code=378, Internet Archive Wayback Machine, Captured from Dec. 9, 2021, pp. 1-2 (Year: 2021).

* cited by examiner

LUBRICATOR CONTROL SYSTEM

TECHNOLOGICAL FIELD

The present invention relates to lubricator control, in particular to a lubricator control system.

BACKGROUND

With the wide application of lubricators in civil and commercial fields, more stringent requirements are put forward for the detection and control process of lubricators.

However, on the one hand, the current wireless communication modes of lubricators, especially single-point lubricators, only include two types: "long distance and high power consumption" (such as "Wi-Fi") and "short distance and low power consumption" (such as Bluetooth). However, in the application of equipment in industrial field, these two types of wireless communication modes have certain disadvantages. In the traditional lubricator control, there is no control strategy that can have both long distance and low power consumption communication characteristics, which leads to the failure to implement reliable and stable remote monitoring and control process of lubricators (such as single-point lubricators). On the other hand, at present, the monitoring and control of the lubricator is usually implemented only through a plurality of separate and discrete controlling components, and there is no complete solution for lubricator control. That is, there is no control logic dedicated to lubricator and an integrated lubricator control system integrated with software, hardware, firmware, cloud services and other components, which leads users to be unable to remotely view and read the operating status data and alarm information of lubricators in a simple and convenient way, and to deal with the problems in the operation and characteristic operation of lubricators in time and effectively. This is not conducive to the reliable control of the lubricator and makes the man-machine interaction poor. In addition, in this way of use, most of the current lubricators are always in a high-power consumption operation state, which leads to excessive power consumption, adversely affects their service life and requires frequent battery replacement, resulting in high operation and maintenance costs for lubricators.

SUMMARY

Therefore, a lubricator control system and a control method are needed, which may carry out data interaction with the lubricator via remote wireless communication with low power consumption on the premise of realizing reliable control and good monitoring of the lubricator, and may have comprehensive integration including software, hardware, cloud services and other components specific to the lubricator, wherein the lubricator control system and the lubricator control method may have good man-machine interaction so that users can check the lubricator state in a simple and convenient way and realize low power consumption control of the lubricator. Particularly, the remote low-power communication process with high quality of service (QoS) can be realized through the lubricator control system so as to realize reliable, low-delay and high-precision control of lubricator.

In view of the above problems, the invention provides a lubricator control system.

In some embodiments, a lubricator control system comprises: a lubricator; an Internet-of-things platform; and an application server; wherein the lubricator communicates with the application server in a long-distance and low-power consumption wireless communication mode, and wherein a communication process comprises: the lubricator communicates with the Internet-of-things platform based on a 5G-NB-IoT communication mode and sends target information to the Internet-of-things platform in the long-distance and low-power consumption wireless communication mode, and the Internet-of-things platform sends the target information to the application server; the application server receives the target information and sends corresponding target response information to the Internet-of-things platform, and the Internet-of-things platform communicates with the lubricator based on the 5G-NB-IoT communication mode and sends the target response information to the lubricator in the long-distance and low-power consumption wireless communication mode.

In some embodiments, the lubricator switches to a sleep state after receiving the target response information.

In some embodiment, the target information is lubricator registration request information, the lubricator registration request information includes lubricator identification data, and the target response information is registration response information.

In some embodiments, the target information is lubricator state detection data, wherein the lubricator wakes up from the sleep state when periodic reporting time is reached, obtains the lubricator state detection data, and sends the lubricator state detection data to the Internet-of-things platform.

In some embodiments, wherein the target information is alarm information generated while the lubricator performs a periodic oil filling task, wherein the lubricator wakes up from the sleep state when periodic oil filling time for the periodic oil filling task is reached, and the lubricator generates alarm information and sends the alarm information to the Internet-of-things platform when the lubricator is in an abnormal oil filling state.

In some embodiments, the alarm information corresponding to an abnormal type and an abnormal degree is generated based on the abnormal type and the abnormal degree for the abnormal oil filling state.

In some embodiments, the system further comprises a user terminal, and the communication process further comprises the application server sending the target information to the user terminal.

In some embodiments the communication process between the lubricator and the application server further comprises: the application server sends target configuration command information together with the target response information to the Internet-of-things platform when receiving the target information from the lubricator, and the Internet-of-things platform communicates with the lubricator based on the 5G-NB-IoT communication mode and sends the target configuration command information together with the target response information to the lubricator in the long-distance and low-power consumption wireless communication mode; the lubricator generates corresponding target configuration command response information, and communicates with the Internet-of-things platform based on the 5G-NB-IoT communication mode, sends the target configuration command response information to the Internet-of-things platform in the long-distance and low-power consumption wireless communication mode, and the Internet-of-things platform sends the target configuration command response information to the application server; and wherein the lubricator is further configured to perform a corresponding target operation based on the target configuration command information, and enter a sleep state after performing the target operation.

In some embodiments, the target configuration command information includes a configuration command for the periodic oil filling time and/or the periodic reporting time for the periodic oil filling task.

In some embodiments, the system further comprises a user terminal, and the application server receives the target configuration command information from the user terminal.

BRIEF DESCRIPTION OF THE DRAWINGS

In order to explain the technical scheme of the embodiment of the present invention more clearly, the drawings needed in the description of the embodiment will be briefly introduced below. Obviously, the drawings in the following description are only some embodiments of the present invention. For those skilled in the art, other drawings can be obtained according to these drawings without creative work. The following drawings are not deliberately drawn to the same scale as the actual size, emphasis is placed on showing the gist of the present invention.

DETAILED DESCRIPTION

The technical scheme in the embodiments of the present invention will be described clearly and completely with the attached drawings. Obviously, the described embodiments are only a part of the embodiments of the present invention, but not the whole embodiments. Based on the embodiments of the invention, all other embodiments obtained by those skilled in the art without creative work also belong to the scope of protection of the invention.

As shown in the present application and claims, the words "a", "an", and/or "the" do not refer to the singular, but may also include the plural. Generally speaking, the terms "comprising", "including" and "containing" refer to clearly identified steps and elements, but these steps and elements do not constitute an exclusive list, and a method or device may also include other steps or elements. That is, these terms are to be interpreted in an open-ended manner that does not limit a description to only the disclosed steps or elements.

Although the present application makes various references to some modules in the system according to the embodiments of the present application, any number of different modules can be used and run on the user terminal and/or the server. The modules are merely illustrative, and different aspects of the system and method may use different modules.

Flowcharts are used in this application to explain the operations performed by the system according to the embodiments of this application. It should be understood that the preceding or following operations are not necessarily performed accurately in order. On the contrary, various steps can be processed in reverse order or at the same time, as needed. At the same time, other operations can be added to these processes, or one or more steps can be removed from these processes.

According to an aspect of the present disclosure, a lubricator control system 100 is disclosed. The lubricator control system 100, for example, includes a lubricator. The lubricator may, for example, report relevant data/alarm information on the lubricator side via the wireless network according to actual needs, and receive control commands via the wireless network.

Figure 1:
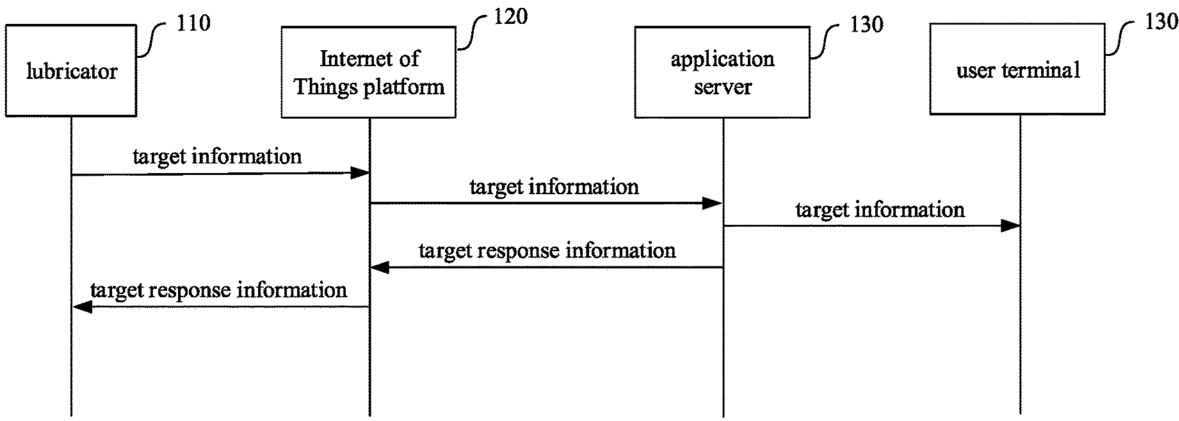
FIG. 1 is a schematic diagram of a lubricator control system 100 according to the embodiments of the present disclosure.

FIG. 1 is a schematic diagram of a lubricator control system 100 according to the embodiments of the present invention. Referring to FIG. 1, the lubricator control system 100 includes, for example, a lubricator 110, an Internet-of-things platform 120 and an application server 130.

The lubricator control system 100 is an integrated control system dedicated to lubricators, which can include multiple components such as software, hardware and firmware and can perform multiple functions such as monitoring and controlling lubricators.

The lubricator 110 refers to a device that applies a lubricant (such as lubricating oil, hereinafter also referred to as oil) to a target device. The lubricator may be, for example, a single-point lubricator. The target device may be, for example, a rotating shaft of a machine tool, a fan bearing, or other components according to actual needs. Embodiments of the present disclosure are not limited by the specific type of the lubricator and the specific device type of the target device to which the lubricant is applied.

The Internet-of-things platform 120 refers to a huge network platform formed by combining various devices and technologies (such as information sensors, radio frequency identification technology, a global positioning system, infrared sensors, laser scanners and the like) with the network according to actual needs. It aims to realize the interconnection of people, machines and things, and realize the ubiquitous connections between things and things, things and people through the access of corresponding target networks under specific conditions so as to realize the intelligent perception, identification and management of target objects and processes.

It should be understood that, according to actual needs, the Internet-of-things platform may be, for example, an IoT platform formed by an IoT server in the NB-IoT communication mode, or a LoRa platform formed by a network server in the LoRa communication mode.

At this time, the lubricator can be used as a terminal node of the Internet-of-things platform, for example, and communicate with the Internet-of-things platform via a specific communication protocol/communication mode of the Internet-of-things platform.

The application server refers to a server device set up to realize a specific application purpose or application scenario. For example, the application server may generally include a processor and a memory and execution logic and execution content can be set in advance by a user or an application provider. For example, in the lubricator control system, the application server may be, for example, a server in the application scenario of lubricator control, which aims to cooperate with the lubricator and the Internet-of-things platform to achieve a good lubricator control.

For example, the application server may communicate with the Internet-of-things platform to obtain corresponding information from the Internet-of-things platform. And the application server can also communicate with the user terminal or interact with the user via a web interface, for example so that the user can receive information from the application server/input commands to the application server in a simple and convenient way.

Among them, the lubricator 110 communicates with the application server 120 in a long-distance and low-power consumption wireless communication mode. The long distance (i.e., Wide Area) refers to the long transmission distance of communication data; that is, the lubricator can realize the long-distance communication process with the application server at a place far away from the application server. The low power consumption means that the lubricator as the terminal node during the communication process can complete the communication process only in a low power consumption state. That is, the terminal node can maintain its work only with a small amount of electric energy.

It should be understood that according to the actual situation, for example, different communication protocols can be used to implement the long-distance and low-power consumption communication process between the lubricator 110 and the application server 120. Specifically, for example, the long-distance and low-power consumption communication process can be implemented according to NB-IoT protocol based on 5G cellular mobile network, or it can also be implemented by a LoRa gateway based on the LoRaWan communication protocol. Next, the above two long-distance and low-power consumption communication modes will be explained respectively.

In some embodiments, the long-distance and low-power consumption communication process is implemented based on the 5G-NB-IoT communication mode, for example. Next, the above communication process based on the 5G-NB-IoT communication mode will be described in more detail. At this time, the Internet-of-things platform 120 is an IoT platform.

For example, referring to FIG. 1, the communication process may include that the lubricator 110 communicates with the Internet-of-things platform 120 based on the 5G-NB-IoT communication mode, and sends target information to the Internet-of-things platform 120 in the long-distance and low-power consumption wireless communication mode, and the Internet-of-things platform 120 sends the target information to the application server 130.

The 5G-NB-IoT refers to a Narrow Band Internet of Things (NB-IoT) communication mode based on a 5G cellular network.

Among them, the Narrow Band Internet of Things (NB-IoT) is an Internet of Things based on a cellular network, which only consumes about 180 kilohertz (kHz) bandwidth. Because it supports cellular data link of low-power consumption devices in the wide area network, it is also called low-power consumption wide area network (LPWAN), which has the characteristics of wide coverage, multiple connections, low power consumption and low cost.

Compared with the currently widely used 2G/3G/4G cellular network, the 5G cellular network has many advantages, such as high speed, low delay and large capacity, which means that the Narrow Band Internet of Things based on 5G cellular network can access more terminal nodes, support M2M connection and lower delay.

The target information refers to the information that the lubricator intends to transmit to the application server. For example, according to actual needs, the target information may be state detection data of the lubricator, and it can also be alarm information during the lubricator's specific operation (such as a periodic oil filling task).

For example, the process by which the lubricator sends the target information to the Internet-of-things platform based on the 5G-NB-IoT communication mode is that the lubricator sends the target information to the Internet-of-things platform in a long-distance and low-power consumption wireless communication mode.

The process by which the Internet-of-things platform sends the target information to the application server 130 will be described in more detail. For example, the Internet-of-things platform can communicate with the application server via the HTTPS (Hyper Text Transfer Protocol over Secure Socket Layer) protocol, and send the target information to the application server.

However, it should be understood that the Internet-of-things platform can communicate with the application server in other ways, for example, via Remote Procedure Call (RPC) or via the preset OpenAPI interface of the Internet-of-things platform. The embodiments of the present disclosure are not limited by the specific communication mode between the Internet-of-things platform and the application server.

Thereafter, continuing to refer to FIG. 1, the application server 130 receives the target information and sends the corresponding target response information to the Internet-of-things platform 120. The Internet-of-things platform 120 communicates with the lubricator 110 based on the 5G-NB-IoT communication mode and sends the target response information to the lubricator 110 in a long-distance and low-power consumption wireless communication mode.

The target response information refers to information generated in response to a successful reception of the target information, which is intended to represent the successful reception of the target information. For example, the target response information may be ACK (Acknowledge character) information, that is, acknowledgement character information, to confirm that the target information has been properly received.

Thereafter, the user can, for example, obtain relevant target information from the application server, or can also communicate with the application server through the user terminal to read or review the target information.

Based on the above, in this application, by setting the lubricator control system including the lubricator, the Internet-of-things platform and the application server, an integrated control system including software, hardware and firmware dedicated to lubricator control is provided, which improves the man-machine interaction and enables users to view the lubricator's state and control the lubricator in a simple and convenient way. Secondly, the lubricator is set to communicate with the application server in a long-distance and low-power consumption wireless communication mode, in particular the lubricator is set to communicate with the Internet-of-things platform in the 5G-NB-IoT communication mode so as to implement the sending of target information and the receiving of target response information. On the one hand, this can realize long-distance and low-power consumption data transmission between the lubricator and the Internet-of-things platform based on the wide-area and low-power consumption communication characteristics of the NB-IoT (Narrow Band Internet of Things). On the other hand, based on the effectiveness and long-distance characteristics of the cellular network, the data transmission efficiency and speed of the lubricator control system can be further improved, thus effectively overcoming the problems caused by adopting “long-distance, high-power consumption” and “short-distance, low-power consumption” communication modes in the current lubricator control process, and realizing a control strategy with both long-distance and low-power consumption communication characteristics, thus being beneficial to realizing reliable and stable remote monitoring and control of lubricators. In addition, based on the advantages of synchronous communication protocol of 5G-NB-IoT communication mode, it can provide low-power consumption but slow transmission rate for applications requiring small data throughput, which is beneficial to realize a timing communication between the lubricator control system and the lubricator with long-distance and low-power consumption. Especially, the remote low-power consumption communication process with high quality of service (QoS) can be realized through the 5G-NB-IoT-based lubricator control system so as to realize reliable, low-power consumption and long-distance control of the lubricator.

In some embodiments, the long-distance and low-power consumption communication process is implemented based on the LoRa communication mode (standard or protocol), for example. Next, the above communication process based on LoRa communication mode will be described in more detail.

For example, referring to FIG. 1, the lubricator 110 communicates with the Internet-of-things platform 120 based on the LoRaWan communication protocol, and sends the target information to the Internet-of-things platform 120 in a long-distance and low-power consumption wireless communication mode. The Internet-of-things platform 120 sends the target information to the application server 130.

LoRa (Long Range) is a low-power consumption and long-distance local area network wireless standard. LoRaWAN represents an open standard, which defines the communication protocol of LPWAN technology based on LoRa chip.

For example, at this time, the lubricator can be used as a LoRa terminal in the LoRa network, which realizes the communication with the Internet-of-things platform via the LoRa gateway, for example so as to send the target information to the Internet-of-things platform in a long-distance and low-power consumption wireless communication mode according to the LoRaWan communication protocol. At this time, the Internet-of-things platform is formed by a network server (NetWork Server), for example.

As mentioned above, the target information refers to the information that the lubricator intends to transmit to the application server. For example, according to the actual needs, the target information may be state detection data of the lubricator, and it can also be the alarm information during the lubricator’s specific operation (such as the periodic oil filling task).

For example, the process in which the Internet-of-things platform 120 sends the target information to the application server 130 may be explained in more detail. For example, the Internet-of-things platform may communicate with the application server via the HTTPS (Hyper Text Transfer Protocol over Secure Socket Layer) protocol, and send the target information to the application server. The embodiment of the present disclosure is not limited by the specific communication mode between the Internet-of-things platform and the application server.

Thereafter, referring to FIG. 1, the application server 130 receives the target information and sends the corresponding target response information to the Internet-of-things platform 120. The Internet-of-things platform 120 communicates with the lubricator 110 based on the LoRaWan communication protocol and sends the target response information to the lubricator 110 in a long-distance and low-power consumption wireless communication mode.

The target response information refers to information generated in response to the successful reception of the target information, which is intended to represent the successful reception of the target information. For example, the target response information may be, for example, ACK (Acknowledge character) information, that is, acknowledgement character information, to confirm that the target information has been received well.

For example, the user can obtain relevant target information from the application server, or can communicate with the application server via the user terminal to read or review the target information.

Based on the above, in this application, by setting the lubricator control system including the lubricator, the Internet-of-things platform and the application server, an integrated control system including software, hardware and firmware dedicated to lubricator control is provided, which improves the man-machine interaction and enables users to view the lubricator’s state and control the lubricator in a simple and convenient way. Secondly, the lubricator is set to communicate with the application server in a long-distance and low-power consumption wireless communication mode, especially the lubricator is set to communicate with the Internet-of-things platform based on the LoRaWan communication protocol so as to implement the sending of target information and the receiving of target response information, and so as to implement the long-distance and low-power consumption data transmission between the lubricator and the Internet-of-things platform based on the wide-area and low-power consumption communication characteristics of the LoRa standard. Therefore, the problems caused by adopting the communication modes of “long distance, high power consumption” and “short distance, low power consumption” in the control process of the lubricator are effectively overcome, and the control strategy with long distance and low power consumption communication characteristics is realized, thus being beneficial to realizing reliable and stable remote monitoring and control of the lubricator.

In some embodiments, when the long-distance and low-power consumption communication process is implemented based on the LoRaWan communication protocol, the Internet-of-things platform 120 is, for example, a network server, and the lubricator control system further includes, for example, a LoRa gateway.

It should be understood that the LoRa gateway refers to an information bridge between a LoRa terminal and a server (such as the network server) in a network based on the LoRa standard/LoRaWan communication protocol, and it is usually a transceiver with multiple channels.

Among them, the process in which the lubricator communicates with the Internet-of-things platform based on the LoRaWan communication protocol may further include, for example, that the lubricator sends the target information to the LoRa gateway, and the LoRa gateway forwards the target information to the Internet-of-things platform.

For example, the lubricator 110 first sends the target information to the LoRa gateway based on the LoRaWan communication protocol. After receiving the target information, the LoRa gateway further sends the target information to the Internet-of-things platform 120 (here, for example, a network server) based on the LoRaWan communication protocol.

Among them, the communication process between the Internet-of-things platform and the lubricator based on the LoRaWan communication protocol may further include, for example, that the Internet-of-things platform 120 sends the target response information to the LoRa gateway, and the LoRa gateway forwards the target response information to the lubricator.

For example, the Internet-of-things platform 120 first sends the target information to the LoRa gateway based on the LoRaWan communication protocol. After receiving the target information, the LoRa gateway further sends the target information to the lubricator 110 based on the LoRaWan communication protocol.

Based on the above, in this application, in the process of realizing long-distance and low-power consumption communication based on the LoRa standard, by further setting the LoRa gateway and realizing the bidirectional information transmission between the lubricator and the Internet-of-things platform via the LoRa gateway, the reliable and stable information transmission between the lubricator and the Internet-of-things platform under the LoRaWan communication protocol can be well implemented based on the LoRa gateway.

In some embodiments, the lubricator switches to a sleep state after receiving the target response information.

The sleep state refers to the state in which the lubricator operates with low power consumption. In the sleep state, due to the low power consumption characteristics of the NB-IoT/LoRaWan protocol, when the lubricator as the NB terminal/LoRa terminal enters the sleep state (operates with low power consumption), the lubricator can't communicate with the Internet-of-things platform, that is, it can't receive information from the application server or send messages to the application server accordingly.

For example, when the lubricator is in the sleep state, the radio frequency function of the lubricator will be disabled so that it is in a state of being unable to communicate with the Internet-of-things platform.

Based on the above, in this application, by setting the lubricator to switch to the sleep state after receiving the target response information, the lubricator can enter a low-power consumption state after realizing the target information transmission and successfully receiving the target response information from the application server (confirming that the target information is successfully received). Compared with the case that the lubricator detects and communicates with external device in real time to send and receive data (in this case, the lubricator will always be in a state of high power consumption), the setting in this application enables the lubricator to work with only a small amount of electric energy, which can greatly reduce the power consumption of the lubricator and prolong its service life.

Figure 2:
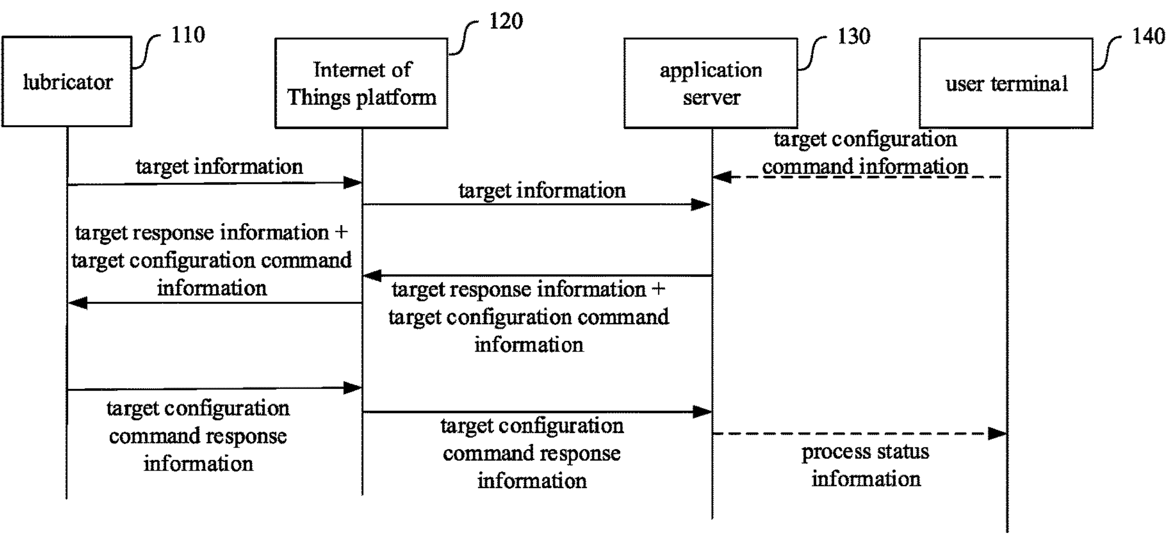
FIG. 2 is a schematic diagram of a command distribution process of the application server 130 according to the embodiments of the present disclosure.

In some embodiments, the communication process between the lubricator and the application server further includes a process in which the application server distributes commands to the lubricator. FIG. 2 shows a schematic diagram of an application server command distribution process according to embodiments of the present disclosure.

It should be understood that in the process of command distribution, corresponding to the aforementioned communication process based on the 5G-NB-IoT communication protocol or the LoRaWan communication protocol, the distribution process may also include, for example, a distribution process based on the 5G-NB-IoT communication protocol and a distribution process based on the LoRaWan communication protocol. Next, they will be explained separately.

In some embodiments, for example, when the communication process is implemented based on the aforementioned 5G-NB-IoT communication protocol, referring to FIG. 2, the process of the command distribution includes, for example, that when (in response to) the target information from the lubricator is received, the application server 130 sends the target configuration command information together with the target response information to the Internet-of-things platform; the Internet-of-things platform 120 communicates with the lubricator 110 based on the 5G-NB-IoT communication protocol, and sends the target configuration command information and the target response information to the lubricator 110 in a long-distance and low-power consumption wireless communication mode.

The target configuration information refers to information used for configuring the lubricator, and may include, for example, configuration information related to the periodic detecting and reporting process of the lubricator and configuration information related to the periodic oil filling task of the lubricator.

The target configuration command information may be, for example, the target configuration information previously input or set by the user in the application server. Or as shown by the dotted lines in FIG. 2, the target configuration command information may also be the target configuration command information received from the user terminal 140 that communicates with the application server.

Thereafter, referring to FIG. 2, the lubricator 110 generates corresponding target configuration command response information and communicates with the Internet-of-things platform based on the 5G-NB-IoT communication protocol to send the target configuration command response information to the Internet-of-things platform 120 in a long-distance and low-power consumption wireless communication mode. The Internet-of-things platform 120 sends the target configuration command response information to the application server 130.

The target configuration command response information refers to reply information for the target configuration command information. For example, when the lubricator properly receives the target configuration command information, the target configuration command response information may be, for example, the target configuration command information ACK information.

Among them, the lubricator is further configured to perform a corresponding target operation based on the target configuration command information and enter a sleep state after performing the target operation.

It should be understood that the process of sending the target configuration command information occurs when (in response to) the application server receives the target information from the lubricator. For example, while the lubricator performs the periodic reporting process, the lubricator performs the periodic oil filling task process or the lubricator performs the registration process, when the lubricator sends the corresponding target information to the application server, the application server may, for example, send the target configuration command information after receiving the target information.

For example, when the target configuration command information is the configuration command for the periodic oil filling time and the periodic reporting time for the periodic oil filling task, the lubricator can reset the periodic oil filling time and the periodic reporting time based on the target configuration command information so as to realize flexible adjustments of the corresponding time.

For example, the application server may determine the process status of the command distribution process according to whether the target configuration command response information is obtained within a preset time, and send the process status information of the distribution process to the user terminal 140. For example, after sending the target configuration information, the application server may determine the process status of the distribution process as "distributing" and send the corresponding process status information to the user terminal to indicate that the target configuration information has been sent. If the target configuration command response information is received within a preset time after sending the target configuration information, the application server may, for example, determine the process status of the distribution process as "executed" and send corresponding process status information to the user terminal to indicate that the distribution process command has been well executed (as shown by the dotted line in FIG. 2). If the response information of the target configuration command information is never received within the preset time after sending the target configuration information, the application server may determine the process status of the distribution process as "distribution timeout" and send corresponding process status information to the user terminal to indicate that the distribution process command is not correctly executed.

In some embodiments, for example, when the communication process is implemented based on the aforementioned LoRaWan communication protocol, referring to FIG. 2, the process of the command distribution includes, for example, that when (in response to) the target information from the lubricator 110 is received, the application server 130 sends the target configuration command information together with the target response information to the Internet-of-things platform 120; the Internet-of-things platform 120 communicates with the lubricator 110 based on the LoRaWan communication protocol and sends the target configuration command information and the target response information to the lubricator 110 in a long-distance and low-power consumption wireless communication mode.

As mentioned above, the target configuration information refers to information used to configure the lubricator, which may include, for example, configuration information related to the periodic detecting and reporting process of the lubricator and configuration information related to the periodic oil filling task of the lubricator.

The target configuration command information may be, for example, the target configuration information previously input or set by the user in the application server, or as shown by the dotted line in FIG. 2. The target configuration command information may also be the target configuration command information received from the user terminal 140 that communicates with the application server.

Thereafter, referring to FIG. 2, the lubricator 110 generates corresponding target configuration command response information, communicates with the Internet-of-things platform 120 based on the LoRaWan communication protocol, and sends the target configuration command response information to the Internet-of-things platform 120 in a long-distance and low-power consumption wireless communication mode. The Internet-of-things platform 120 sends the target configuration command response information to the application server 130.

Among them, the target configuration command response information refers to reply information for the target configuration command information. For example, when the lubricator properly receives the target configuration command information, the target configuration command response information may be, for example, the target configuration command information ACK information.

And the lubricator is further configured to perform a corresponding target operation based on the target configuration command information and enter a sleep state after performing the target operation.

It should be understood that the process of sending the target configuration command information occurs when the application server receives the target information from the lubricator. For example, while the lubricator performs the periodic reporting process, the lubricator performs the periodic oil filling task process or the lubricator performs the registration process, when the lubricator sends the corresponding target information to the application server, the application server may, for example, send the target configuration command information after receiving the target information.

For example, when the target configuration command information is the configuration command for the periodic oil filling time and the periodic reporting time for the periodic oil filling task, the lubricator can reset the periodic oil filling time and the periodic reporting time based on the target configuration command information so as to realize flexible adjustment of the corresponding time.

For example, the application server may determine the process status of the command distribution process according to whether the target configuration command response information is obtained within a preset time, and send the process status information of the distribution process to the user terminal 140. The specific process is as described in detail for the command distribution process under the 5G-NB-IoT communication protocol, and will not be repeated here.

Based on the above, in this application, the application server is set to send the target configuration command information to the lubricator when (in response to) receiving the target information from the lubricator, and to receive the target configuration command response information from the lubricator; and the lubricator is set to perform the corresponding target operation based on the target configuration command information and enter a sleep state after performing the target operation. Compared with the current technical scheme of actively sending control commands to control the lubricator, this application set the application server to passively send control commands according to actual needs only when receiving the information uploaded by the lubricator. On the one hand, this enables the lubricator not to send information when it is in a low power consumption sleep state (at this time, the radio frequency function of the lubricator is disabled, and the communication function cannot be implemented), but only to send the information when it is in a normal operation state for communication, which can be well adapted to the operation mode of the lubricator with long-distance and low-power consumption characteristics, thus ensuring a reliable control process under the condition of low power consumption. On the other hand, after the lubricator uploads the information, the application server sends the target configuration command information together with the target response information so that the data transmission efficiency of single communication can be improved.

In some embodiments, the lubricator will first register with the application server, in which case the target information is lubricator registration request information which includes lubricator identification data, and the target response information is registration response information.

The lubricator registration request information refers to the information that lubricator requests to register with the application server. The registration response information refers to information representing the response of the application server to the lubricator registration request. For example, in the case that the application server receives the lubricator registration request information and successfully registers it, the registration response information may be, for example, ACK information.

The lubricator identification information refers to information for identifying the lubricator itself, which may be, for example, SIM card IMSI, SIM card ICCID, an so on, according to the actual situation. Embodiments of the present disclosure are not limited by the specific type and composition of the identification information.

Figure 3:
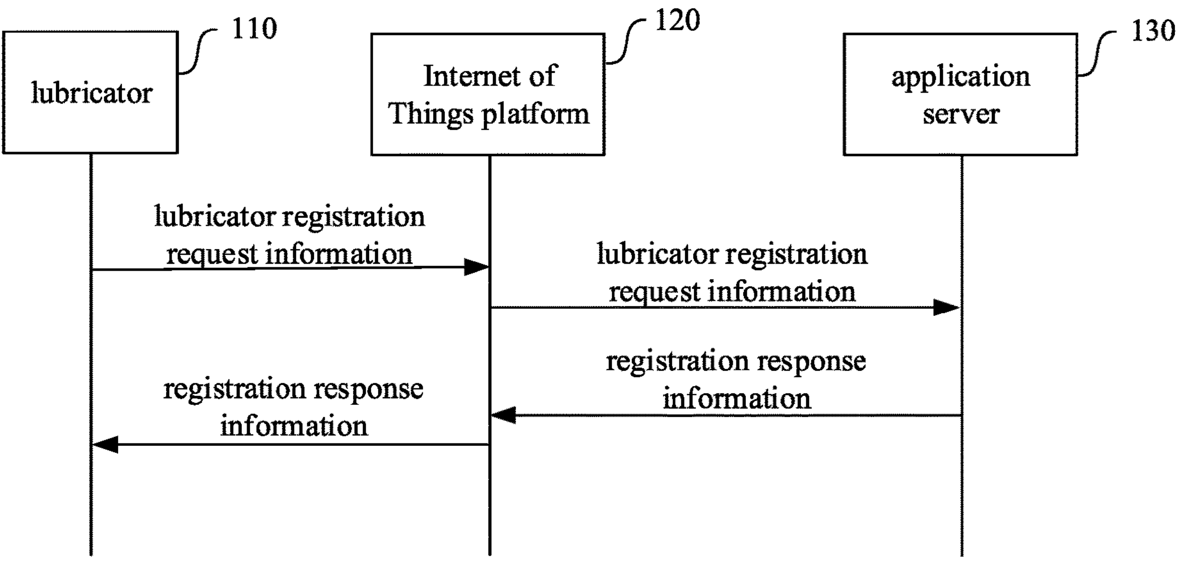
FIG. 3 is a schematic diagram of a process of registering the lubricator 110 with the application server 130 according to the embodiments of the present disclosure.

FIG. 3 shows a schematic diagram of the process of registering the lubricator 110 with the application server 130 according to embodiments of the present disclosure. Next, the above process will be described in more detail with reference to FIG. 3.

For example, after the lubricator is powered on, it can go through the registration process. During the registration process, the lubricator 110 generates lubricator registration request information (including lubricator identification data of the lubricator, for example), communicates with the Internet-of-things platform 120 based on the 5G-NB-IoT communication mode or the LoRaWan communication protocol, and sends the lubricator registration request information to the Internet-of-things platform 120. After (in response to) receiving the lubricator registration request information, the Internet-of-things platform further forwards the lubricator registration request information to the application server 130 that communicates with the Internet-of-things platform.

Then, the application server obtains the lubricator identification data based on the lubricator registration request information and implements the registration of the lubricator on the application server side based on the lubricator identification data so that the application server can identify the lubricator and carry out data interaction with it later. After registration, the application server generates registration response information (ACK information), and sends this information to the Internet-of-things platform. The Internet-of-things platform forwards this information to the lubricator. The information transmission process among the application server, the Internet of Things and the lubricator is as described above, and will not be described here.

Based on the above, in this application, by setting the target information as the lubricator registration request information and the target response information as the registration response information, and including lubricator identification data in the lubricator registration request information, the lubricator registration process with the application server can be well implemented so as to facilitate good information interaction between the lubricator and the application server.

In some embodiments, the lubricator will periodically perform a state detection data reporting process (hereinafter also referred to as a reporting process), and the target information is lubricator state detection data, which refers to the detected data related to lubricator's state. The target response information is reported response information.

For example, the lubricator state detection data may include, for example, battery power detection data and/or lubricating oil emptying detection data of the lubricator, and may also include one or more other detection data according to actual needs.

Figure 4:
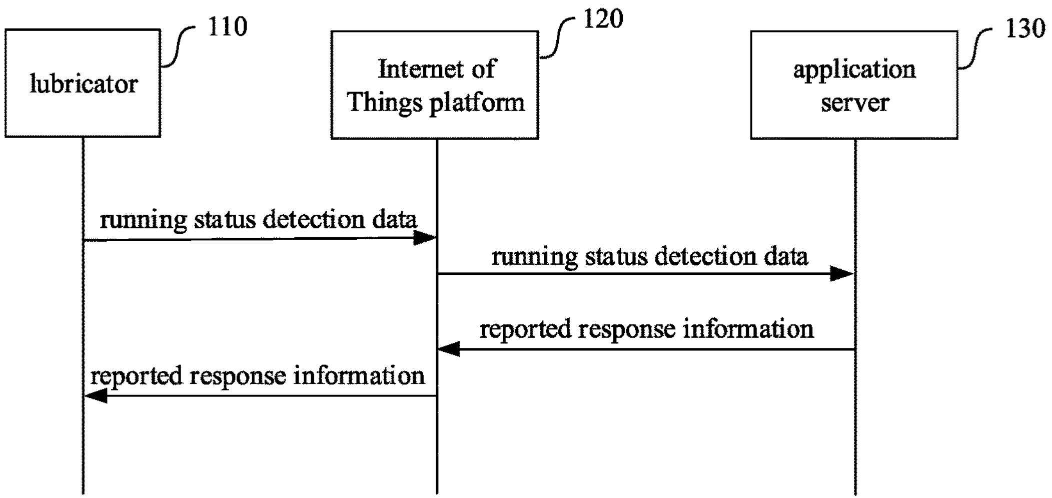
FIG. 4 is a schematic diagram of a periodic reporting process of the lubricator according to the embodiments of the present disclosure.

FIG. 4 shows a schematic diagram of a periodic reporting process of a lubricator according to embodiments of the present disclosure. Referring to FIG. 4, the process of sending the lubricator state detection data can be described in more detail, for example. For example, when the periodic reporting time is reached, the lubricator 110 wakes up from the sleep state, obtains lubricator state detection data, and sends the lubricator state detection data to the Internet-of-things platform 120. Based on the aforementioned communication mode (as described in detail in connection with FIG. 1), the Internet-of-things platform 120 forwards the lubricator state detection data to the application server 130, and forwards the report response information received from the application server 130 to the lubricator 110.

The periodic reporting time refers to the time when the lubricator is configured to report the running status to the application server. The process of reporting the running status is, for example, a process that is executed periodically, and its execution time (i.e., periodic reporting time) can be preset inside the lubricator, or set by the application server during the communication between the lubricator and the application server, for example, during the registration of the lubricator to the application server (the specific setting method is described in detail in connection with FIG. 2).

The process of controlling the lubricator to wake up from the sleep state refers to the process of switching the lubricator from the sleep state with low power consumption to the normal operation mode with high power consumption. Next, the normal operation mode will be described. In this normal operation mode, the lubricator may, for example, perform steps including detecting lubricator state, performing lubricator preset operation (such as oil filling operation). And in this normal operation mode, the lubricator may send target information to the application server and receive target response information from the application server.

The process of obtaining lubricator state detection data can be described in more detail. For example, the lubricator may collect data related to lubricator state detection (i.e., lubricator state detection data) in the normal operation mode after waking up. According to an example, the lubricator state detection data may be data detected in the background by respective sensors of the lubricator in a low power consumption mode when the lubricator is in a sleep state. According to another example, the lubricator state detection data may be data obtained by performing lubricator state detection after the lubricator wakes up. Among them, the lubricator state detection includes, for example, battery power detection and lubricating oil emptying detection of the lubricator, and the corresponding lubricator state detection data may include, for example, battery power detection data and lubricating oil emptying detection data of the lubricator.

It should be understood that the lubricator state detection data may include different contents, for example, according to different detection results. For example, when the battery power and lubricating oil emptying state of the lubricator are in normal state, the current battery power data and lubricating oil emptying data can be recorded and sent to the Internet-of-things platform as lubricating oil state detection data, and then forwarded to the application server via the Internet-of-things platform. When the battery power of the lubricator and/or the lubricating oil emptying state are in an abnormal state, for example, corresponding alarm data or error identification data can be recorded and reported to the application server.

Based on the above, in this application, the lubricator wakes up from the sleep state when the periodic reporting time is reached, obtains the lubricator state detection data, and sends the lubricator state detection data to the Internet-of-things platform. On the one hand, the lubricator does not need to carry out the high-power consumption detection process and upload the state detection data in real time, so it does not need to be in the high-power consumption state, which effectively reduces the power consumption of the lubricator. On the other hand, when the set reporting time is reached, the lubricator can flexibly adjust the state mode and wake up from the low-power consumption sleep state to implement the detection and reporting process so that the detection of the lubricator state can be properly implemented, and the detection time period can be flexibly set according to actual needs, for example.

In some embodiment, the lubricator will perform a periodic oil filling task and perform a periodic oil filling alarm process when the periodic oil filling task is abnormal. At this time, the target information is the alarm information generated while the lubricator performs the periodic oil filling task, and the target response information is the alarm response information.

The periodic oil filling task refers to the operation of applying lubricating oil to the target component at a specific time performed by the lubricator. The alarm information refers to information indicating that the lubricator is in an abnormal oil filling state.

Figure 5:
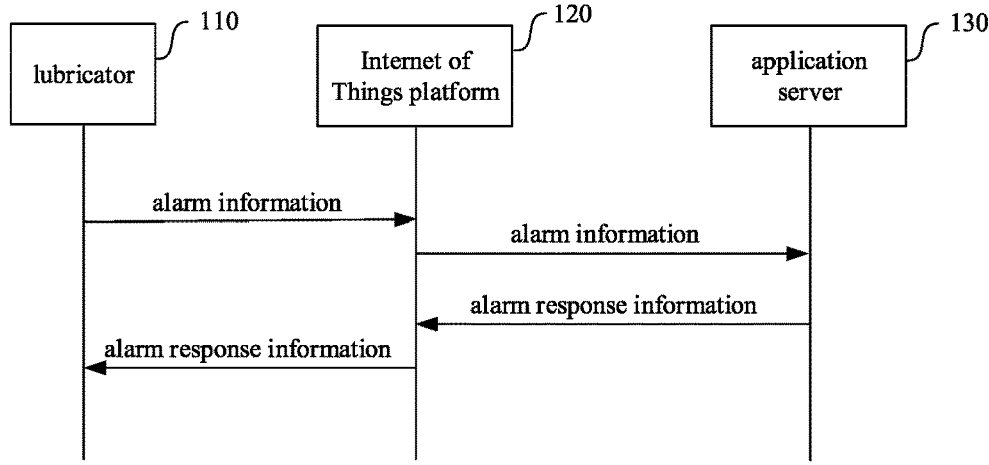
FIG. 5 is a schematic diagram of a periodic oil filling alarm process of the lubricator 110 according to the embodiments of the present disclosure.

FIG. 5 shows a schematic diagram of the periodic oil filling alarm process of the lubricator 110 according to the embodiments of the present disclosure.

Referring to FIG. 5, the lubricator 110 wakes up from the sleep state when the periodic oil filling time for the periodic oil filling task is reached. When the lubricator 110 is in an abnormal oil filling state, the lubricator 110 generates alarm information and sends the alarm information to the Internet-of-things platform 120. The Internet-of-things platform 120 forwards the alarm information to the application server 130 based on the aforementioned communication mode. The application server 130, for example, generates target response information (here, alarm response information) as the response. The target response information is forwarded to the lubricator 110 via the Internet-of-things platform.

The periodic oil filling time refers to the time when the lubricator is configured to perform an oil filling task. The oil filling task is, for example, a task that is performed periodically, and the execution time (i.e., the periodic oil filling time) can be preset in the lubricator or set by the application server during the communication between the lubricator and the application server, for example, during the registration of the lubricator to the server (the specific setting mode is described in detail in connection with FIG. 2).

The process of controlling the lubricator to wake up from the sleep state refers to the process of switching the lubricator from the sleep state with low power consumption to the normal operation mode with high power consumption. In this normal operation mode, the lubricator may, for example, perform steps including detecting lubricator state and performing lubricator preset operation (such as oil filling operation). And in this normal operation mode, the lubricator may send target information to the application server and receive target response information from the application server.

Based on the above, in this application, the lubricator wakes up from the sleep state when the periodic oil filling time for the periodic oil filling task is reached, and when the lubricator is in an abnormal oil filling state, the lubricator generates alarm information and sends the alarm information to the Internet-of-things platform. On the one hand, the lubricator is switched from a low power consumption state to a high power consumption state when the oil filling task needs to be performed so that the lubricator does not need to be in a high power consumption state in real time, thereby effectively reducing the power consumption of the lubricator. On the other hand, when the oil filling task is abnormal, the lubricator can also upload the alarm information to the application server in time, which is convenient for users to check and further process, and improves the use safety and reliability of the lubricator.

In some embodiments, referring to FIG. 1, the system further includes a user terminal 140, and the communication process further includes that the application server 130 sends the target information to the user terminal 140.

The user terminal may be, for example, application (app) software installed on the user's mobile communication device, or a terminal interface (such as a webpage interface) set for the user.

It should be understood that the application server can choose different communication modes to send the target information to the user terminal according to different specific forms of the user terminal, and the embodiments of the present disclosure are not limited by the specific communication modes between the application server and the user terminal.

Based on the above, in this application, the lubricator control system also includes the user terminal, and the target information sent to the application server can be further transmitted to the user terminal so that the user can obtain the target information in a simple and convenient way, thus improving the level of human-machine interaction and facilitating the user to know the relevant information of the lubricator in time and to process it accordingly.

In some embodiments, when the application server executes the process of command distribution, the target configuration command information includes a configuration command for the periodic oil filling time and/or the periodic reporting time for the periodic oil filling task.

The configuration command for the periodic oil filling time for the periodic oil filling task may be used, for example, to modify or update the periodic oil filling time. The configuration command for the periodic reporting time may be used, for example, to modify or update the periodic reporting time.

Based on the above, in this application, the target configuration command information is set to include the configuration command for the periodic oil filling time and/or the periodic reporting time for the periodic oil filling task so that the application server can adjust the periodic oil filling time and the periodic reporting time accordingly based on the received target information and the user control command, in the communication process between the lubricator and the application server (for example, during the registration process, the periodic reporting process and the alarm uploading process in the periodic oil filling task) so as to facilitate the flexible and reliable control of the lubricator.

Figure 6:
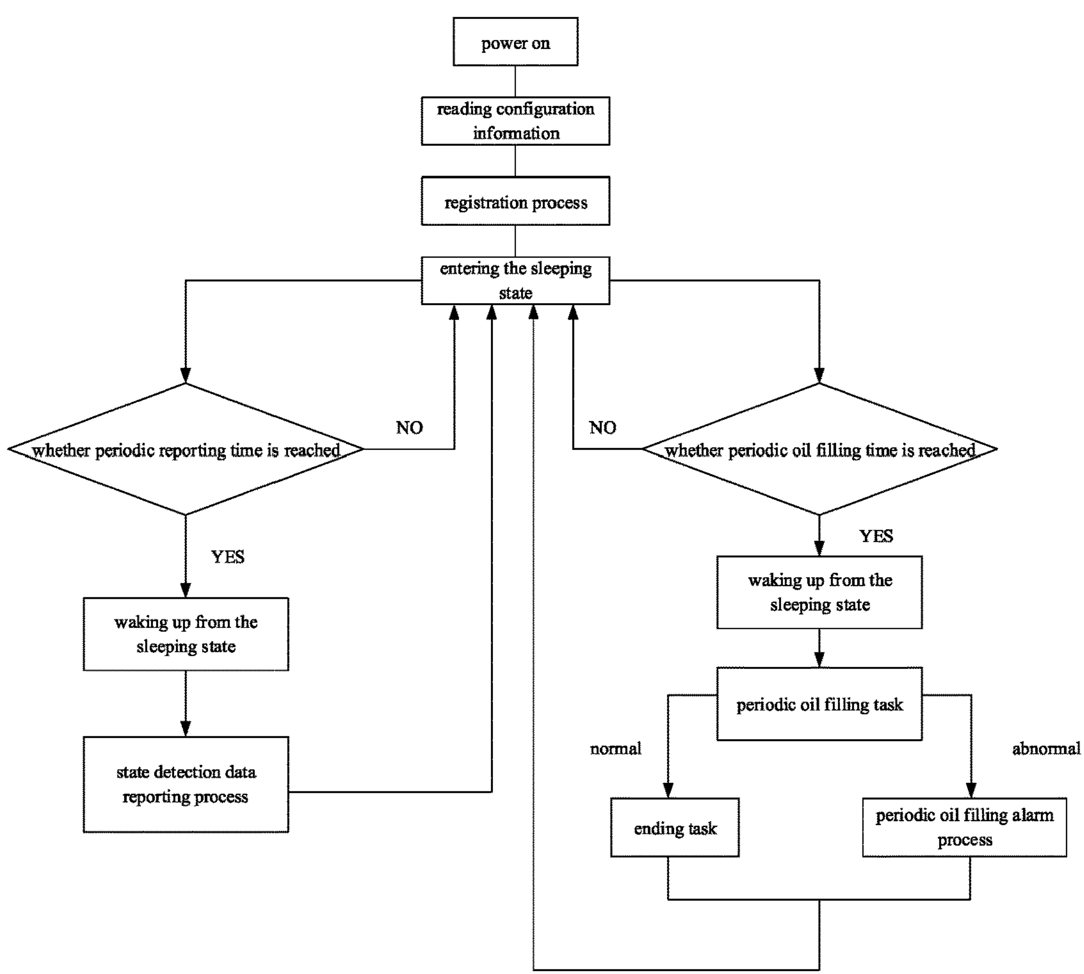
FIG. 6 is a single-point lubricator control process according to the embodiments of the present disclosure.

According to another aspect of the present disclosure, a lubricator control method is also disclosed, which can be implemented via the above said lubricator control system. Next, the lubricator control method will be explained in more detail with specific examples. FIG. 6 shows a lubricator control process according to the embodiments of the present disclosure.

Referring to FIG. 6, firstly, the lubricator (here, taking a single-point lubricator as an example) is powered on through the system, and after the power on, for example, configuration information is first read (including, for example, the periodic oil filling time and the periodic reporting time for the periodic oil filling task stored in the single-point lubricator in advance and the operation steps to be performed by the single-point lubricator). Thereafter, if the single-point lubricator has not been registered with the application server, the configuration information includes, for example, a step of performing a registration process. The single-point lubricator will perform a registration process to register with the application server, as described in detail with reference to FIG. 3. After completing the registration process, the single-point lubricator switches, for example, into a sleep state.

In some embodiments, the single-point lubricator will also determine whether the configured periodic reporting time is reached. When the periodic reporting time is reached, the single-point lubricator wakes up from the sleep state and performs the state detection data reporting task. For example, the execution process of the reporting task is as described above with reference to FIG. 4.

Among them, the process of executing the state detection data reporting task can be described in more detail. For example, the single-point lubricator can collect data related to lubricator state detection (i.e. lubricator state detection data) in the normal operation mode after waking up. The process of collecting data related to lubricator state detection can be described in more detail. For example, according to one example, the lubricator state detection data may be data detected in the background by respective sensors of the lubricator in a low power consumption mode when the lubricator is in a sleep state. For example, according to another example, the lubricator state detection data may be data obtained by performing lubricator state detection after the lubricator wakes up. Among them, the lubricator state detection includes, for example, battery power detection and lubricating oil emptying detection of the lubricator, and the corresponding lubricator state detection data may include, for example, battery power detection data and lubricating oil emptying detection data of the lubricator.

In the following, the specific process of battery power detection and lubricating oil emptying detection will be explained in detail through some specific examples.

For example, the battery power detection process includes reading the battery voltage, such as the current operation voltage value of the battery, comparing the operation voltage value with a preset first voltage threshold (for example, 3.6V), and determining the state of the battery power based on the comparison result. Among them, in order to improve the detection accuracy of the operation voltage value, the average voltage value obtained by averaging the voltage values read for many times (for example, 3 to 5 times) can be used as the operation voltage value.

If the operation voltage value is greater than the first voltage threshold (for example, operation voltage value≥3.6V), the state of the battery power is determined as normal, and the corresponding battery power detection data for reporting is recorded. The battery power detection data may include, for example, battery power data or identification data indicating that the battery power is normal. It should be understood that the reported battery power detection data may also include other required data according to specific actual requirements.

If the operation voltage value is less than the first voltage threshold (for example, operation voltage value<3.6V), the operation voltage value is further compared with a second voltage threshold (for example, 3.3V).

If the operation voltage value is less than the first voltage threshold and greater than the second voltage threshold (for example, 3.3V<operation voltage value<3.6V), the state of battery power is determined as low-priority abnormal, and the corresponding battery power detection data for reporting is recorded. In this state, the battery power detection data may include only battery power alarm data, or may also include both battery power data and battery power alarm data, for example. Among them, the battery power alarm data includes data representing the abnormal type and the abnormal degree. For example, in this state, the abnormal type is "battery power being slightly abnormal" and the abnormal degree is "yellow alert". It should be understood that the reported battery power detection data may also include other required data according to specific actual requirements.

If the operation voltage value is less than or equal to the second voltage threshold (for example, operation voltage value≤3.3V), the state of battery power is determined as high-priority abnormal, and the corresponding battery power detection data for reporting is recorded. Among them, the battery power alarm data includes data representing the abnormal type and the abnormal degree. The abnormal type represents the type corresponding to the abnormal state, and the abnormal degree represents the urgency degree corresponding to the abnormal state, that is, the priority degree of the anomaly. For example, in this state, the abnormal type is "battery power being abnormal" and the abnormal degree is "red alert". It should be understood that the battery power detection data for reporting may also include other required data according to specific actual requirements.

Understandably, the "red alert" in this disclosure corresponds to a higher urgency degree than the "yellow alert". Therefore, the processing priority of alarm information including "red alert" is higher than that of alarm information including "yellow alert".

For example, the process of lubricating oil emptying detection includes: detecting the remaining available times of lubricating oil, calculating the ratio of the remaining available times to the initial total times, and determining whether the ratio is less than or equal to a ratio threshold. The ratio threshold can be set as a percentage, for example, twenty percent. If the calculated ratio is less than or equal to the ratio threshold, the lubricating oil emptying state is determined as abnormal, and the corresponding lubricating oil emptying detection data for reporting is recorded. The lubricating oil emptying detection data may include, for example, lubricating oil emptying data and lubricating oil emptying alarm data. Among them, the lubricating oil emptying alarm data includes data representing the abnormal type and the abnormal degree. For example, in this state, the abnormal type is "lubricating oil emptying being abnormal" and the abnormal degree is "red alert". It should be understood that the lubricating oil emptying detection data for reporting can also include other required data according to specific actual requirements.

Based on the above, the single-point lubricator may collect/obtain data related to lubricator state detection, and report the collected/obtained data to the server through the wireless network. The specific reporting method may refer to the above description with reference to FIG. 4. In addition, the single-point lubricator may also receive control commands (for example, target configuration command information) from the server through the wireless network while performing the periodic reporting process. After completing the periodic reporting task, the single-point lubricator switches, for example, to a sleep state.

Based on the above, in this application, by controlling the lubricator to wake up from the sleep state when it reaches the periodic reporting time, the lubricator state detection data is obtained, and the lubricator state detection data is reported through the wireless network. On the one hand, the lubricator does not need to detect and upload the state detection data in real time in a high-power consumption mode so that it is not always in a high-power consumption state, and the power consumption of the lubricator is effectively reduced. On the other hand, when the set reporting time is reached, the lubricator can flexibly adjust the state mode and wake up from the low-power consumption sleep state to implement the detection and reporting process so that the detection of the lubricator state can be well implemented, and the reporting time period can be flexibly set according to actual needs, for example.

In some embodiments, the single-point lubricator may, for example, determine whether the configured periodic oil filling time is reached. When the periodic oil filling time is reached, the single-point lubricator may wake up from the sleep state and perform the periodic oil filling task, and perform the periodic oil filling alarm process when the periodic oil filling process is abnormal. For example, the reporting method of periodic oil filling alarm is described in detail with reference to FIG. 5. And the single-point lubricator will continue to enter the sleep state after the oil filling task ends normally or after an abnormal alarm occurs.

For example, when the lubricator performs the periodic oil filling task, the lubricator may first perform lubricator state detection (including battery power detection and lubricating oil emptying detection as mentioned above, for example). Under the condition that the detection result of the lubricator state detection is normal, the lubricator is controlled to perform oil filling operation to continue the oil filling task. Under the condition that the detection result of the lubricator state detection is abnormal, the lubricator is controlled to stop the oil filling task, and alarm information is generated and sent through the wireless network.

Among them, for example, the detection result of the lubricator state detection may be comprehensively determined based on the detection result of battery power detection and the detection result of lubricating oil emptying detection. For example, according to the system design requirements, different criteria may be adopted to determine whether the detection result of the lubricator state detection is normal. Next, some exemplary criteria will be given.

For example, it may be determined that the detection result of the lubricator state detection is normal only when the battery power detection state and the lubricating oil emptying detection state are both normal. Otherwise, it is determined that the detection result of the lubricator state detection is abnormal. For another example, it can be determined that the detection result of the lubricator state detection is normal under the condition that the battery power detection state is normal or low-priority abnormal and the lubricating oil emptying detection state is normal. Otherwise, it is determined that the detection result of the lubricator state detection is abnormal. For yet another example, it can be determined that the detection result of the lubricator state detection is normal under the condition that the battery power detection state is normal or low-priority abnormal. In other words, as long as the operation voltage value of the battery is greater than the second voltage threshold (for example, 3.3V), it can be determined that the detection result of the lubricator state detection is normal, thus the lubricator can be controlled to perform oil filling operation without stopping the oil filling task.

In addition, under the condition that the detection result of the lubricator state is normal, the motor is driven to operate, and the motor state detection is performed during the operation of the motor. Specifically, the state of the motor will be determined based on real-time parameters associated with the operation of the motor. Under the condition that the state of the motor is a normal state, the oil filling operation is completed to normally end the oil filling task. Under the condition that the state of the motor is an abnormal state, alarm information is sent through the wireless network. Among them, the real-time parameters associated with the operation of motor include at least one of motor current, motor pressure and motor rotation time.

Based on the above, it should be understood that if the detection result of the lubricator state detection is abnormal, alarm information may be generated based on the data related to the abnormal state of lubricator, for example. If the detection result of the lubricator state detection is normal and it is determined that the motor is in an abnormal state in the subsequent motor state determination, alarm information may be generated based on the data related to the motor anomaly. The content of the alarm information is different according to the location where the anomaly occurs during oil filling.

In some embodiments, when the state of the motor is an abnormal state, for example, alarm information corresponding to the abnormal type and the abnormal degree may be generated based on the abnormal type and the abnormal degree of the abnormal oil filling state.

The abnormal type represents the type corresponding to the abnormal state, and the abnormal degree represents the urgency degree corresponding to the abnormal state, that is, the priority degree of the anomaly.

For example, when the state of the motor is an abnormal state, the abnormal type and the abnormal degree for the abnormal state are determined. Based on the abnormal type and the abnormal degree, alarm information corresponding to the abnormal type and the abnormal degree is sent through the wireless network.

The specific process of oil filling operation performed by the single-point lubricator will be described in detail through some specific examples.

For example, under the condition that the battery power detection state is normal or low-priority abnormal, it is determined that the detection result of the lubricator state detection is normal, and the motor is driven to operate.

After the motor starts to operate, a state detection is further performed on the motor. For example, after the motor rotates, the detection of the motor state may be delayed for a predetermined time interval (for example, 500 ms) to filter out the initial current of the motor. Specifically, the motor state may be detected based on the real-time parameters associated with the operation of the motor, and different processing procedures can be taken according to different detection results.

For example, the motor state can be detected based on the motor current associated with the operation of the motor. Specifically, the current value of the motor current can be read, and the pressure value of the motor pressure can be calculated based on the read current value. For example, the current value of the motor current may be read once every 100 ms, and after five consecutive readings, the average value of the five read current values can be calculated and the calculated average value may be converted into a pressure value (based on a known or previously determined relationship between current and pressure value). According to different pressure values, the following different determination on the motor state will be made and the following different treatment processes will be taken.

The pressure value is compared with a first pressure threshold (for example, 4.5 Bar). If the pressure value is less than the first pressure threshold (for example, pressure value<4.5 Bar), it is determined that the motor in a normal state. In this normal state, the lubricator is controlled to perform oil filling operation. After the oil filling is successful, the motor stops operating.

If the pressure value is greater than or equal to the first pressure value (for example, pressure value≥4.5 Bar), the pressure value is further compared with a second pressure threshold value (for example, 5.5 Bar).

If the pressure value is greater than or equal to the first pressure threshold and less than the second pressure threshold (for example, 4.5 Bar≤pressure value<5.5 Bar), it is determined that the motor state is abnormal. In this abnormal state, the lubricator is controlled to continue the oil filling operation, and alarm information corresponding to the abnormal state of the motor is generated, and the corresponding alarm information is immediately reported through the wireless network. After the oil filling operation is completed, the motor stops operating. Among them, the abnormal type corresponding to the alarm information is "high pressure alarm" and the abnormal degree corresponding to the alarm information is "yellow alert".

If the pressure value is greater than or equal to the second pressure threshold (for example, pressure value≥5.5 Bar), the pressure value is further compared with a third pressure threshold (for example, 6.5 Bar).

If the pressure value is greater than or equal to the second pressure threshold and less than the third pressure threshold (for example, 5.5 Bar≤pressure value<6.5 Bar), it is determined that the motor state is abnormal. In this abnormal state, the lubricator is controlled to continue the oil filling operation, and alarm information corresponding to the abnormal state of the motor is generated, and the corresponding alarm information is immediately reported through the wireless network. After the oil filling operation is completed, the motor stops operating. Among them, the abnormal type corresponding to the alarm information is "high pressure alarm" and the abnormal degree corresponding to the alarm information is "red alert". At the same time, for example, the number of alarms in this state can be accumulated. When the alarm of this abnormal type and degree appears for three consecutive oil filling cycles, the oil filling operation will be stopped immediately when the pressure value reaches the threshold interval (for example, 5.5 Bar≤pressure value<6.5 Bar).

If the pressure value is greater than or equal to the third pressure threshold value (for example, 6.5 Bar), it is determined that the motor state is abnormal. In this abnormal state, the lubricator is controlled to stop the oil filling operation immediately, and the alarm information is reported immediately through the wireless network. Among them, the abnormal type corresponding to the alarm information is "high pressure alarm" and the abnormal degree corresponding to the alarm information is "red alert".

In addition, for example, the motor state can also be detected based on the motor rotation time associated with the operation of the motor. Specifically, the continuous rotation time of the motor can be monitored during the rotation of the motor. If the continuous rotation time of the motor exceeds the rotation time threshold (for example, 12 s), it is determined that the motor state is abnormal. In this abnormal state, the lubricator is controlled to stop the oil filling operation immediately, and alarm information is reported immediately through the wireless network, and the motor stops operating at the same time. Among them, the abnormal type corresponding to the alarm information is "internal error stop", more specifically, the abnormal type corresponding to the alarm information is "motor limit switch failure". The abnormal degree corresponding to the alarm information is "red alert".

For example, in the detection of motor operation state, it can also include a detection of motor blockage. When it is detected that the motor is in a blockage condition, corresponding alarm information is generated.

It should be understood that the motor will stop operating, and the lubricator will enter a sleep state after the motor stops operating in both cases of the oil filling ending normally and the abnormal alarm for oil filling being generated. For example, it is possible to wait for the next oil filling time by restarting the timer.

Based on the above, in this application, by setting the abnormal type and the abnormal degree based on the abnormal oil filling state, and generating the alarm information corresponding to the abnormal type and the abnormal degree, the specific type and priority degree of the current abnormal situation can be clearly reflected in the alarm information, which is beneficial for users to adopt different response measures and treatment methods for different priorities.

Based on the above, in this application, when the periodic oil filling time for the periodic oil filling task is reached, the lubricator wakes up from the sleep state, and when the lubricator is in an abnormal oil filling state, the lubricator generates alarm information and reports the alarm information to the server through the wireless network. On the one hand, the lubricator is switched from a low power consumption state to a high power consumption state when the oil filling task needs to be performed so that the lubricator does not need to be in a high power consumption state in real time, thereby effectively reducing the power consumption of the lubricator. On the other hand, when the oil filling task is abnormal, the lubricator can upload the alarm information to the application server in time, which is convenient for users to check and further handle, and improves the use safety and reliability of the lubricator.

In addition, a display unit (including one or more LED lights, for example) may be arranged on the single-point lubricator, and the display unit can transmit information with different functions and different states in different display modes. Among them, different display modes include different colors and/or different flashing modes of LED lights.

In addition, during the registration process of the single-point lubricator, the periodic reporting process of detection data and the periodic oil filling alarm process (that is, when the single-point lubricator sends the target information to the application server), the application server may check whether there is the target configuration command information to be sent. If there is the target configuration command information, the application server may send the target configuration command information together with the target response information back to the single-point lubricator (the specific communication process is described in detail with reference to FIG. 2) so as to update the periodic oil filling time and/or the periodic reporting time for the periodic oil filling task.

Furthermore, it should be understood that each of the lubricators includes or is associated with appropriate sensors as necessary for measuring voltage, time or any of the other values that are to be communicated to the Internet-of-things platform and that each of the lubricators includes or is associated with an appropriate transmitter, receiver or transceiver for communicating with the Internet-of-things platform.

The program part in technology can be regarded as a "product" in the form of executable code and/or related data, which is participated in or implemented by computer-readable media. Tangible, permanent storage media can include the memory or storage used by any computer, processor, or similar devices or related modules. For example, various semiconductor memories, tape drives, disk drives, or similar devices that can provide storage functions for software. The phrase "non-transitory computer readable medium" refers to a tangible computer storage medium on which information is stored.

All software or a part of it may sometimes communicate through a network, such as the Internet or other communication networks. Such communication can load software from one computer device or processor to another. For example, software is loaded from a server or a host computer of the target tracking device to a hardware platform of a computer environment, or other computer environments that realize the system, or systems with similar functions related to providing information needed for target tracking. Therefore, another medium that can transmit software elements can also be used as a physical connection between local devices, such as light waves, electric waves, electromagnetic waves, etc., which may be spread through cables, optical cables or air. Physical media used for carrier waves (such as cables, wireless connections or optical cables) may also be considered as media for carrying software. Unless the usage here is limited to tangible "storage" media, other terms referring to computer or machine "readable media" refer to media that participate in the execution of any instructions by a processor.

The application uses specific words to describe the embodiments of the application. Such as "the first/second embodiment", "an embodiment" and/or "some embodiments" mean a certain feature, structure or characteristic related to at least one embodiment of the present application. Therefore, it should be emphasized and noted that references to "an embodiment" or "one embodiment" or "an alternative embodiment" in different places in this specification do not necessarily refer to the same embodiment. In addition, some features, structures or characteristics in one or more embodiments of the present application can be appropriately combined.

In addition, those skilled in the art can understand that various aspects of the application can be illustrated and described by several patentable categories or situations, including any new and useful process, machine, product or substance combination, or any new and useful improvement on them. Accordingly, various aspects of the present application can be completely executed by hardware, completely executed by software (including firmware, resident software, microcode, etc.), or executed by a combination of hardware and software. All the above hardware or software can be called "block", "module", "engine", "unit", "component" or "system". Furthermore, aspects of the present application may be embodied as a computer product in one or more computer-readable media, which includes computer-readable program code.

Unless otherwise defined, all terms (including technical and scientific terms) used herein have the same meaning as commonly understood by one of ordinary skill in the art to which this invention belongs. It should also be understood that terms such as those defined in general dictionaries should be interpreted as having meanings consistent with their meanings in the context of the related art, and should not be interpreted in an idealized or extremely formal sense unless explicitly defined herein.

The above is an explanation of the present invention in terms of exemplary embodiments, and should not be considered as a limitation. Although several exemplary embodiments of the present invention have been described, those skilled in the art will easily understand that many modifications can be made to the exemplary embodiments without departing from the novel teaching and advantages of the present invention. Therefore, all these modifications are intended to be included within the scope of the invention as defined by the claims appended hereto. It should be understood that the above description of the invention should not be considered as limited to the specific embodiments disclosed, and modifications to the disclosed embodiments and other embodiments are intended to be included within the scope of the appended claims. The invention is defined by the claims and their equivalents.

What is claimed is:

1. A lubricator control system comprising:

a lubricator;

an Internet-of-things platform; and an application server;

wherein the lubricator is configured to communicate with the application server in a long-distance and low-power consumption wireless communication mode, wherein the lubricator is configured to communicate with the Internet-of-things platform via a 5G-NB-IOT communication protocol and to send target information to the Internet-of-things platform in the long-distance and low-power consumption wireless communication mode, wherein the Internet-of-things platform is configured to send the target information to the application server, wherein the application server is configured to receive the target information and to send corresponding target response information to the Internet-of-things platform, wherein the Internet-of-things platform is configured to send the target response information to the lubricator via the 5G-NB-IOT communication protocol in the long-distance and low-power consumption wireless communication mode, and wherein the target information includes lubricator registration request information including lubricator identification data, and the target response information includes registration response information.

2. A lubricator control system comprising:

a lubricator;

an Internet-of-things platform; and an application server;

wherein the lubricator is configured to communicate with the application server in a long-distance and low-power consumption wireless communication mode, wherein the lubricator is configured to communicate with the Internet-of-things platform via a 5G-NB-IOT communication protocol and to send target information to the Internet-of-things platform in the long-distance and low-power consumption wireless communication mode, wherein the Internet-of-things platform is configured to send the target information to the application server, wherein the application server is configured to receive the target information and to send corresponding target response information to the Internet-of-things platform, wherein the Internet-of-things platform is configured to send the target response information to the lubricator via the 5G-NB-IOT communication protocol in the long-distance and low-power consumption wireless communication mode, wherein the lubricator is configured to switch to a sleep state after receiving the target response information, wherein the target information includes lubricator state detection data, and wherein the lubricator is configured to wake up from the sleep state at predetermined intervals, to obtain the lubricator state detection data, and to send the lubricator state detection data to the Internet-of-things platform.

3. The lubricator control system according to claim 2, wherein the target information includes alarm information generated while the lubricator performs a periodic oil filling task, and wherein the lubricator is configured to generate alarm information and send the alarm information to the Internet-of-things platform when the lubricator is in an abnormal oil filling state.

4. The lubricator control system according to claim 3, wherein alarm information corresponding to an abnormal type and an abnormal degree is generated based on detection of a type and a degree of the abnormal oil filling state.

5. The lubricator control system according to claim 2, further comprising a user terminal, wherein the application server is configured to send the target information to the user terminal.

6. The lubricator control system according to claim 2, wherein the application server is configured to send target configuration command information together with the target response information to the Internet-of-things platform in response to receiving the target information, wherein the Internet-of-things platform is configured to send the target configuration command information together with the target response information to the lubricator;

wherein the lubricator is configured to generate corresponding target configuration command response information and to send the target configuration command response information to the Internet-of-things platform, wherein the Internet-of-things platform is configured to send the target configuration command response information to the application server; and wherein the lubricator is configured to perform a corresponding target operation based on the target configuration command information, and to enter a sleep state after performing the target operation.

7. The lubricator control system according to claim 6, wherein the target configuration command information includes a configuration command for the periodic oil filling time and/or the periodic reporting time for the periodic oil filling task.

8. The lubricator control system according to claim 6, wherein the system further comprises a user terminal, and the application server is configured to receive the target configuration command information from the user terminal.

9. The lubricator control system according to claim 2, wherein the target information includes lubricator registration request information including lubricator identification data, and the target response information includes registration response information.

* * * * *